US007834612B2

(12) United States Patent
Sohnis et al.

(10) Patent No.: US 7,834,612 B2

(45) Date of Patent: Nov. 16, 2010

(54) METHOD AND APPARATUS FOR REGULATING VOLTAGE IN A REMOTE DEVICE

(75) Inventors: Jonathan Sohnis, Brooklyn, NY (US); Victor Pesok, Brooklyn, NY (US)

(73) Assignee: Altronix Corporation, New York, NY (US)

( * ) Notice: Subject to any disclaimer, the term of this patent is extended or adjusted under 35 U.S.C. 154(b) by 442 days.

(21) Appl. No.: 11/876,485

(22) Filed: Oct. 22, 2007

(65) Prior Publication Data

US 2009/0027034 A1 Jan. 29, 2009

Related U.S. Application Data

(60) Provisional application No. 60/952,070, filed on Jul. 26, 2007.

(51) Int. Cl.
*G05B 24/02* (2006.01)

(52) U.S. Cl. ...................... 323/318; 340/553; 340/660; 340/664

(58) Field of Classification Search ................. 323/281, 323/318; 361/93.6; 340/660, 664
See application file for complete search history.

(56) References Cited

U.S. PATENT DOCUMENTS

| | | | | |
|---|---|---|---|---|
| 3,641,539 | A * | 2/1972 | Lesher | 340/549 |
| 3,980,939 | A * | 9/1976 | Greer | 318/599 |
| 4,090,228 | A | 5/1978 | Lupatin | 361/86 |
| 5,519,295 | A * | 5/1996 | Jatnieks | 318/453 |
| 5,714,847 | A * | 2/1998 | Lindauer et al. | 315/307 |
| 6,522,249 | B1 * | 2/2003 | Lonigro et al. | 340/533 |
| 7,039,821 | B1 | 5/2006 | Potega | 713/340 |
| 7,085,848 | B2 | 8/2006 | Cabrera et al. | 709/232 |
| 7,158,042 | B2 * | 1/2007 | Lederer | 340/660 |
| 7,245,723 | B2 * | 7/2007 | Hinton et al. | 380/263 |
| 7,362,556 | B2 * | 4/2008 | Holce et al. | 361/93.6 |
| 7,546,214 | B2 * | 6/2009 | Rivers et al. | 702/62 |
| 7,595,595 | B2 * | 9/2009 | Mehta | 315/291 |
| 2007/0224461 | A1 * | 9/2007 | Oh | 429/9 |
| 2009/0015232 | A1 * | 1/2009 | Rozen et al. | 323/318 |

* cited by examiner

*Primary Examiner*—Adolf Berhane
*Assistant Examiner*—Yemane Mehari
(74) *Attorney, Agent, or Firm*—Proskauer Rose LLP

(57) ABSTRACT

A system and the method are provided for supplying power to a remote device. In one embodiment, the method involves regulating voltage for at least one device remote from a power source. The regulating includes monitoring a current response of the remote device and adjusting a voltage of the power source until the current response reaches an operating range of the remote device.

21 Claims, 4 Drawing Sheets

Load and Power Supply Characteristic Graphs

The increase in voltage in Graph 2 as compared to Graph 1 for the same current operating point ($I_{PS}$, $I_{LED}$) is due to the compensation of the Power Source for the wire run voltage drop

METHOD AND APPARATUS FOR REGULATING VOLTAGE IN A REMOTE DEVICE

RELATED APPLICATIONS

This application claims the benefit of U.S. Provisional Application No. 60/952,070 filed on Jul. 26, 2007, the entire teachings of which are incorporated herein by reference.

BACKGROUND

A robust market is emerging with preference towards powering low voltage (non AC mains) remote devices from a centralized infrastructure. This is as true for power systems, as it is for communication systems, surveillance systems, and control systems. For example, a need exists for efficient low voltage lighting for signage, power sources for cameras, and other devices that exhibit non-linear and piecewise linear loads.

When installing a new communication system, surveillance system, or control system, one of the first and most important considerations is power demand. Knowing the power demand allows for an efficient and cost-effective matching of a power source to the system requirements. A primary concern when installing lengths of wire between the power supply and remote device is voltage drop. In some instances, the amount of voltage lost between the originating power supply and the remote device can be significant and will vary with a changing load demand. Further, improper control of the power source to compensate for wire gauge, wire length and load current can lead to an unacceptable voltage presented at the remote device.

SUMMARY

Known methods and systems used for powering remote devices monitor voltage at the location of the remote device and feedback the monitored voltage on a pair of dedicated feedback wires (e.g., Kelvin leads). The dedicated feedback wires do not exhibit a significant voltage drop because the dedicated feedback wires only require an insignificant amount of power to transmit the monitored voltage to the controller that controls the voltage at the location of the power source. Monitoring the voltage at the location of the remote device has several disadvantages, for example, each remote device requires a pair of dedicated feedback wires which increases the system cost. Other disadvantages include electrical noise that can be induced on the feedback wire pair that leads to inaccuracies in the remote device's voltage regulation. Further, some remote devices are not designed to accommodate a four wire connection that is needed for two power connections and two feedback monitoring connections.

There is provided a method for providing regulated voltage for at least one device remote from a power source. The method involves monitoring a current response of the remote device and adjusting a voltage of the power source until the current response reaches an operating range of the remote device.

In some embodiments, the remote device can exhibit a non-linear or piecewise linear current-voltage characteristic. In some embodiments, the voltage can be adjusted in steps, wherein the steps can be discreet or continuous. In some embodiments, the operating range of the remote device can be determined by monitoring the current response until the step in the voltage results in a current response equal to a current response of a previous voltage step. In some embodiments, the operating range of the remote device can be determined by monitoring the current response for a specified current response. In some embodiments, the specified current response can be due to a specific voltage step. In some embodiments, the specified current response can be due to a specified sequence of voltage steps. In some embodiments, determining the operating range of the remote device can include adding a bias to the supply voltage step that results in a current response substantially equal to the current response of the previous voltage step.

In some embodiments, the current voltage relationship of the remote device can be processed at the power source to guide the voltage at the remote device to converge into the proper operating range. In some embodiments, the voltage can be adjusted to a level that compensates for the voltage drop in a paired wire pair due to at least one of device current draw, wire gauge, and wire length. In some embodiments, the voltage can be DC or AC.

There is also provided a system for providing regulated voltage for at least one device remote from a power source. The system includes a power source for supplying voltage to a remote device and a controller for monitoring a current response of the remote device and adjusting the voltage of the power source until a current response reaches an operating range of the remote device.

In some embodiments, the remote device can exhibit a non-linear or piecewise linear current-voltage characteristic. In some embodiments, the power source can be coupled to the remote device through a wire pair. In some embodiments, the controller can determine the operating range of the remote device by monitoring the current response. In some embodiments, the controller can monitor the current response over the wire pair.

In some embodiments, the supply voltage can be automatically adjusted to a level that compensates for the voltage drop in the wire pair due to at least to device current draw, wire gauge, and wire length. In some embodiments, the current voltage relationship of the remote device is processed at the power source to guide the voltage at the remote device to converge into the proper operating range.

In some embodiments, the voltage can be DC or AC. In some embodiments, the power source and controller can be integrated into a single device or comprise separate units. In some embodiments, the controller can have a sensor to monitor the current response.

There is further provided a method for providing regulated voltage for at least one device remote from a power source. The method involves means for monitoring a current response of the remote device and means for adjusting a voltage of the power source until the current response reaches an operating range of the remote device.

Advantages of the above-mentioned embodiments over the prior art at least include eliminating a individual feedback loop for each remote device, eliminating the need for a licensed professional to install an AC mains connected power supply local to the device, allowing for a reduction in wire gauge to the full extent that is accommodated by the power source compensation, applicability to a broader range of devices that are not equipped for four wire hook ups, all of which reduces the systems overall cost. Additionally, the embodiments provide greater immunity to lengthy feedback wire pair nose pick up, which can cause inaccuracy in regulation control.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
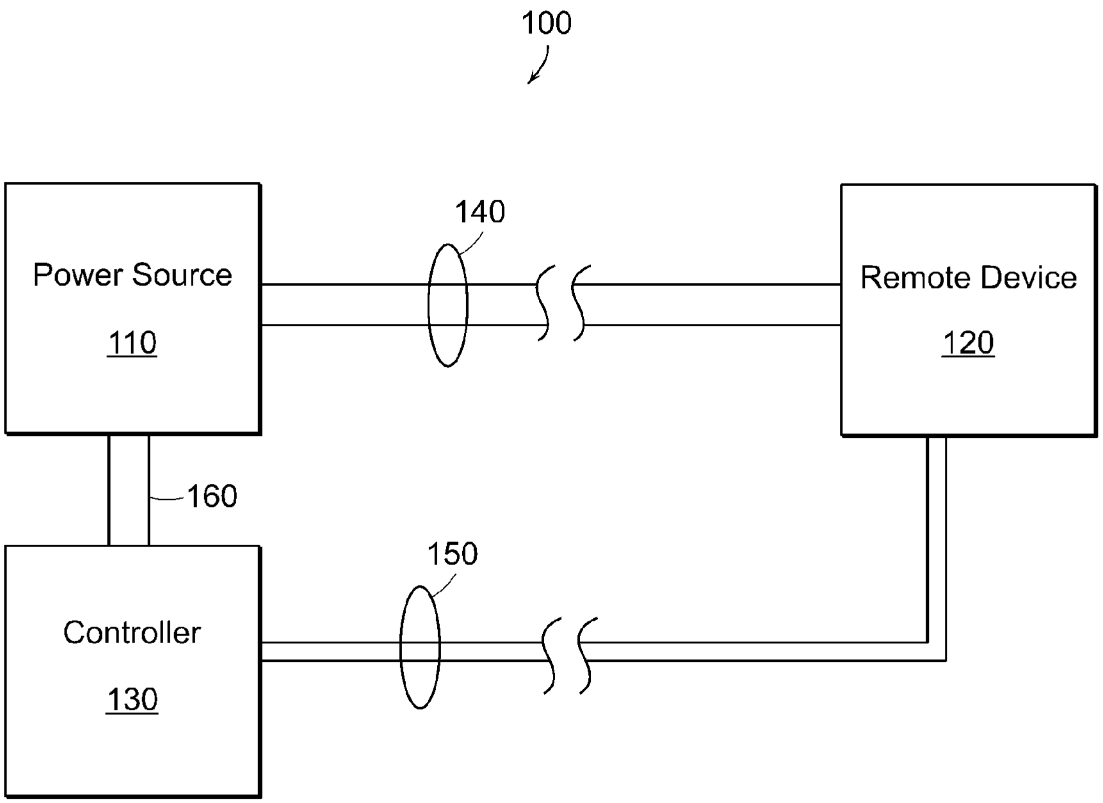
FIG. 1 is a diagram of a typical system for regulating voltage in a remote device, according to the prior art.

FIG. 1 shows a typical power control system 100 according to the prior art. The system 100 includes a power source 110, a remote device 120, and a controller 130. The power source 110 supplies an operating voltage to the remote device 120 over a wire pair or wire run 140. Due to the finite resistance of the wire pair 140, voltage drops are incurred as a function of the loading current of the remote device 120, the wire pair's 140 gauge, and the wire pair's 140 length. Thus, it is necessary to raise the power source voltage 110 to compensate for this inherent loss. As such, the controller 130 includes a feedback loop 150 connected to the remote device 120 for monitoring a voltage level at the remote device 120. If needed, the controller 130 adjusts the power source 110 via a control loop 160. Although one remote device 120 is shown, multiple remote devices 120 can be connected to the power source 110 and the controller 130. As such, each remote device 120 needs a separate feedback loop 150 to monitor its respective voltage level.

Figure 2:
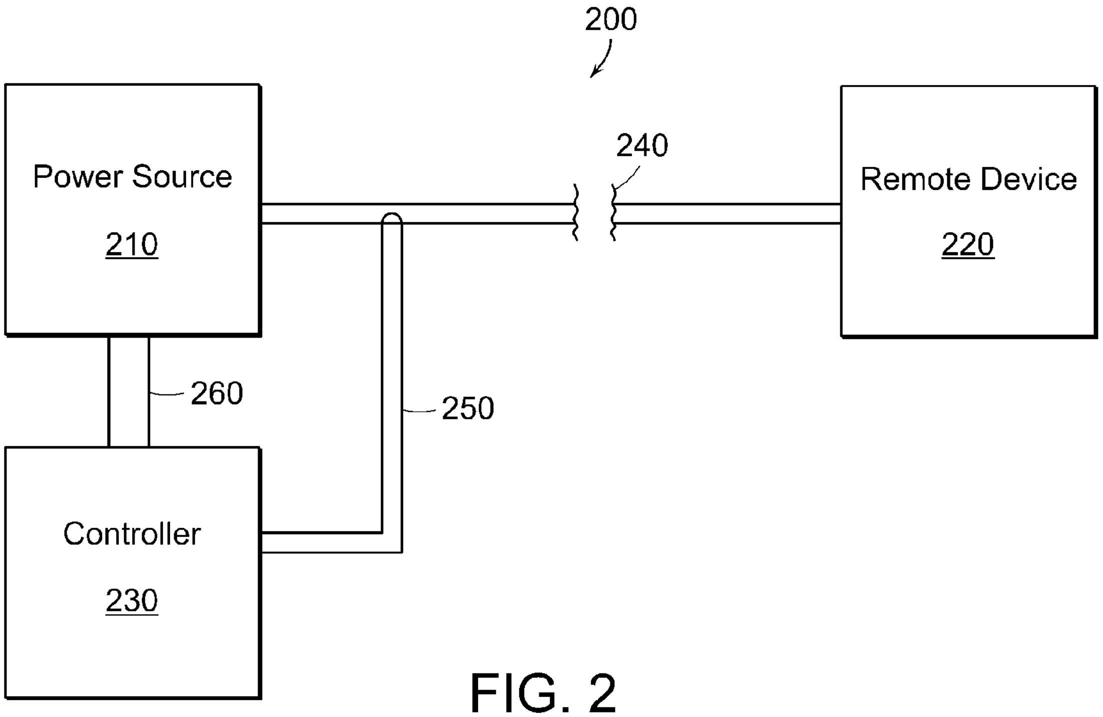
FIG. 2 is a diagram of a system for regulating voltage in a remote device, in accordance with one embodiment of the present invention.

FIG. 2 shows a system 200 for regulating voltage in a remote device or remote system 220. The system 200 includes a power source 210 which supplies an operating voltage to the remote device 220 over a wire pair or wire run 240. Due to the finite resistance of the wire pair 240, voltage drops are incurred as a function of the loading current of the remote device 220, the wire pair's 240 gauge, and the wire pair's 240 length. Thus, it is necessary to raise the voltage of the power source 210 to compensate for the inherent voltage drop. The system 200 includes a controller 230 having a current sensor 250 for monitoring the current response of the wire pair 240 in close proximity to the power source 210. The current sensor 250 can be part of or separate from the controller 230. The controller 230 adjusts the power source 210 according to the current-voltage characteristic of the remote device 220, as is explained further below. In one embodiment, the remote device 220 exhibits a nonlinear current-voltage characteristic. In another embodiment, the remote device 220 exhibits a piecewise linear current-voltage characteristic. Advantageously, the system 200 eliminates the need for the feedback loop 150 (FIG. 1) between the controller 230 and the remote device 220, as described with reference to FIG. 1.

Figure 3:
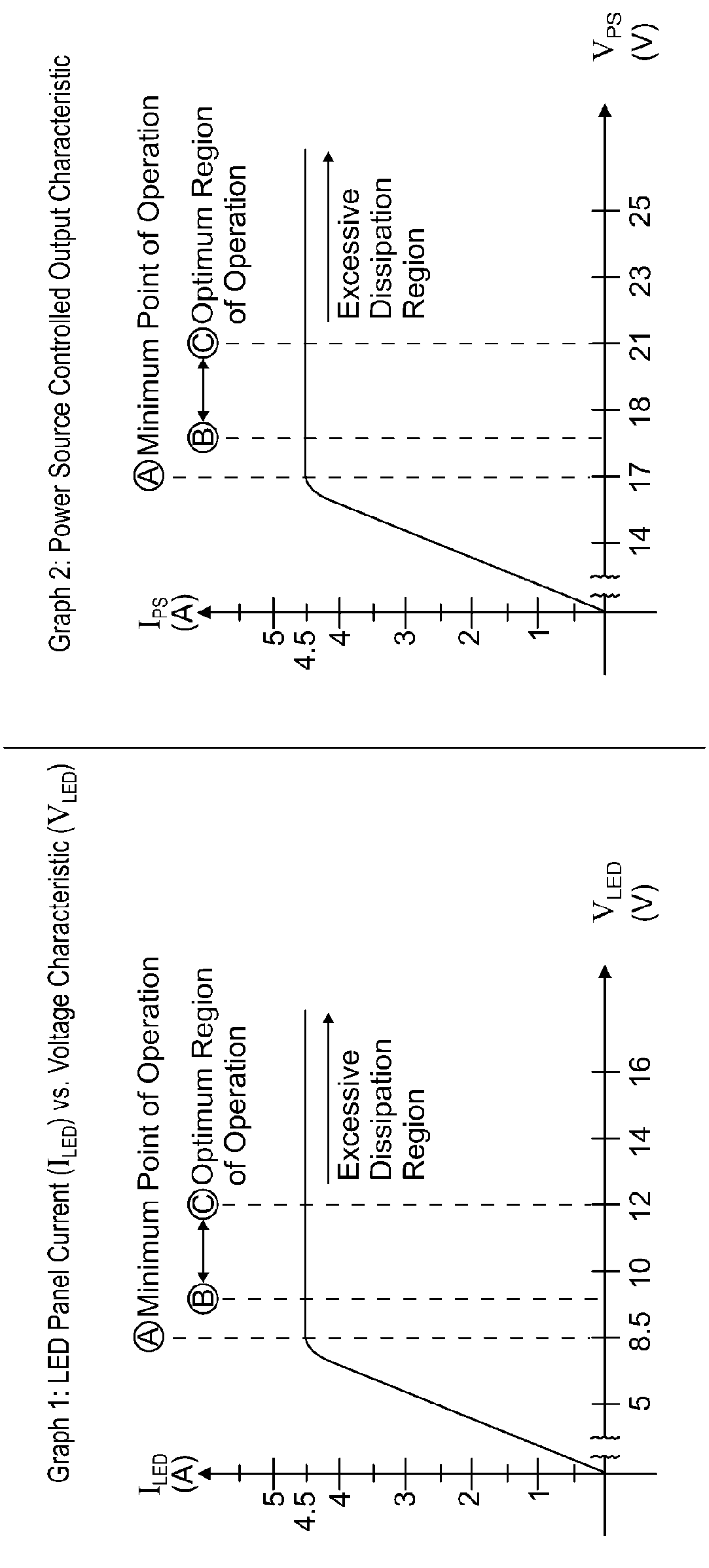
FIG. 3 illustrates the relationships among voltage and current for an exemplary remote device and voltage and current for an exemplary power source.

FIG. 3 shows load and power supply characteristic graphs. Graph 1 and Graph 2 illustrate exemplary current-voltage relationships for a typical power source 210 (FIG. 2) and a typical device 220 (FIG. 2) (e.g., a Light Emitting Diode Panel, also known as a LED backlight device). Graph 1 illustrates the current-voltage relationship ($I_{LED}$ ($V_{LED}$)) for a system when the power source and a device are collocated. Graph 2 illustrates the current-voltage relationship ($I_{PS}$($V_{PS}$)) for a system 200 (FIG. 2) when the power source 210 (FIG. 2) and the device 220 (FIG. 2) are remotely located. As illustrated, Graph 2 shows that a higher voltage is required to operate the device in its optimal region. Thus, a voltage increase is necessary for the current at the remote device 220 (FIG. 2) to equal the current at the collocated device ($I_{PS}=I_{LED}$) because a voltage drop occurs over the wire pair 240 (FIG. 2) supplying the remote device 220 (FIG. 2) and a higher voltage compensates for that drop. For example, for a collocated system where the device is a LED backlight device, a voltage of approximately 9V must be supplied to operate in the optimal region, producing a current of 4.5 A. For a remote system 200 (FIG. 2) where the remote device 220 (FIG. 2) is a LED backlight device, a voltage of approximately 17.75V must be supplied to operate in the optimal region, producing a current of 4.5 A. The increase from the required voltage of 9V for a collocated system to 17.75V for a remote system 200 (FIG. 2) results from a voltage drop of 8.75V over the wire pair 240 (FIG. 2) supplying the remote device 220 (FIG. 2).

Figure 4A:
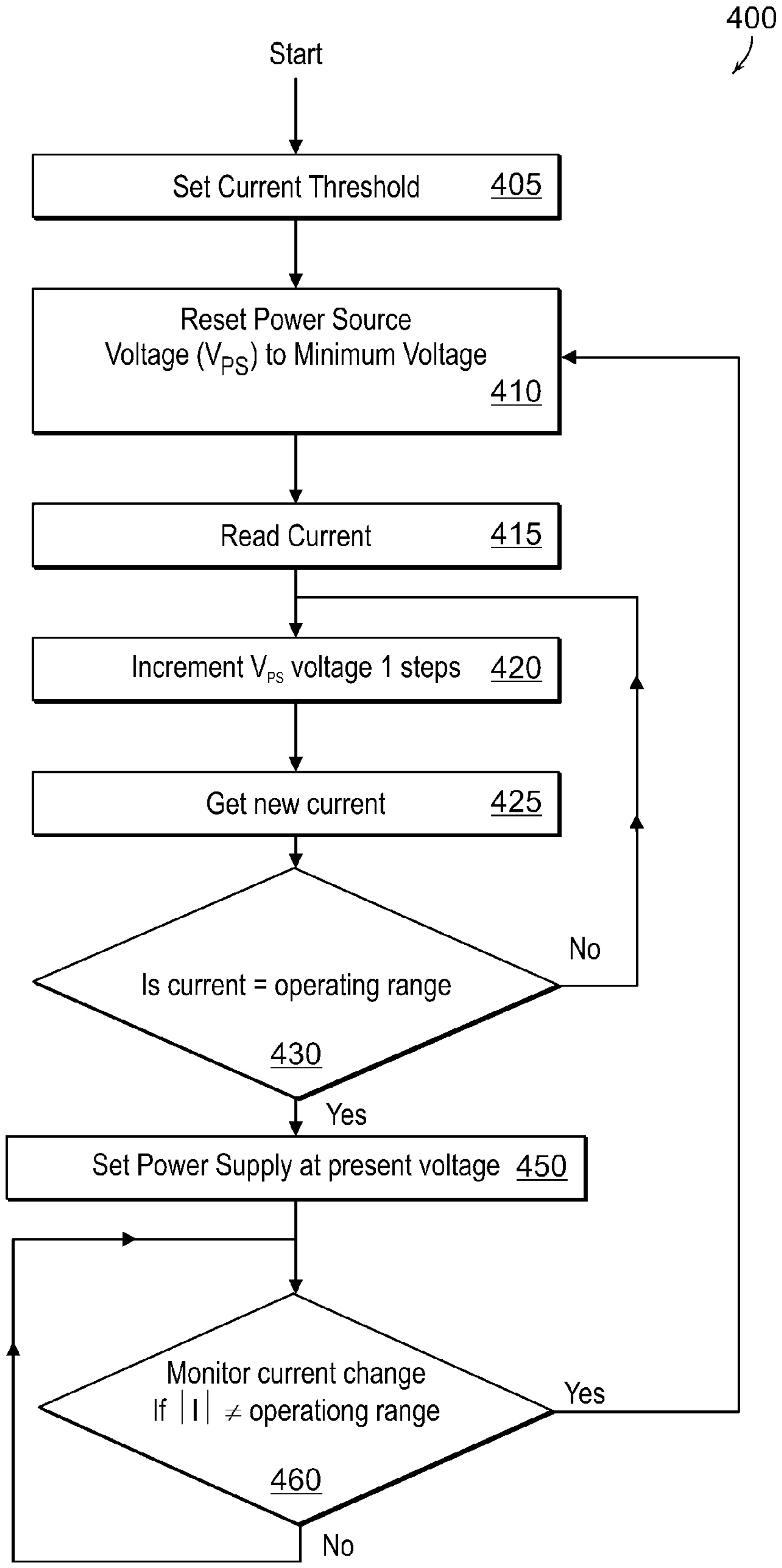
FIG. 4A is a flow diagram illustrating a method for regulating voltage in a remote device where a current threshold for the remote device is set prior to regulation.

FIG. 4A shows one example of a flow diagram or algorithm 400 for varying the voltage at a remote device 220 (FIG. 2). First, a current threshold that depends on the remote device's 220 type is set (Step 405). For example, the current threshold for a LED backlight device can be 4.5 A as shown above in connection with Graph 1 (FIG. 3). Next, the power source 210 (FIG. 2) is set to a minimum voltage (Step 410). For instance, a minimum voltage can be 3.00 volts. Next, the controller 230 (FIG. 2) measures the current at the location of the power source 210 (Step 415). The controller 230 increments the power source 210 voltage (Step 420). For example, a power increment can be one volt or any range of voltages known in the art. The voltage increments can range from fractions of a volt to any number of volts and can be in discrete steps or continuous. A new current is measured based on the step increase in the power source 210 voltage (Step 425).

If the controller 230 determines that the current has reached the desired operating range of the remote device 220 (Step 430), then the controller 230 locks the power supply 210 at the current voltage (Step 450). The desired operating range varies with device and can be any range or combinations of ranges for the current voltage relationship of a given device. For example, the desired operating range can be a set current threshold. The system 200 (FIG. 2) sets the power supply at the present voltage (Step 450) and continuously monitors the current (Step 460) with a change in current prompting a new convergence cycle (Step 410).

If the controller 230 determines that the current has not reached the desired operating range of the remote device 220, then the controller 230 continues to increment the voltage by one step (Step 420) and measure the new current (Step 425) until the desired operating voltage has been reached (Step 430). In some embodiments, the system 200 may combine the power source 210 and the controller 230 as a single integral unit or as separate units.

Figure 4B:
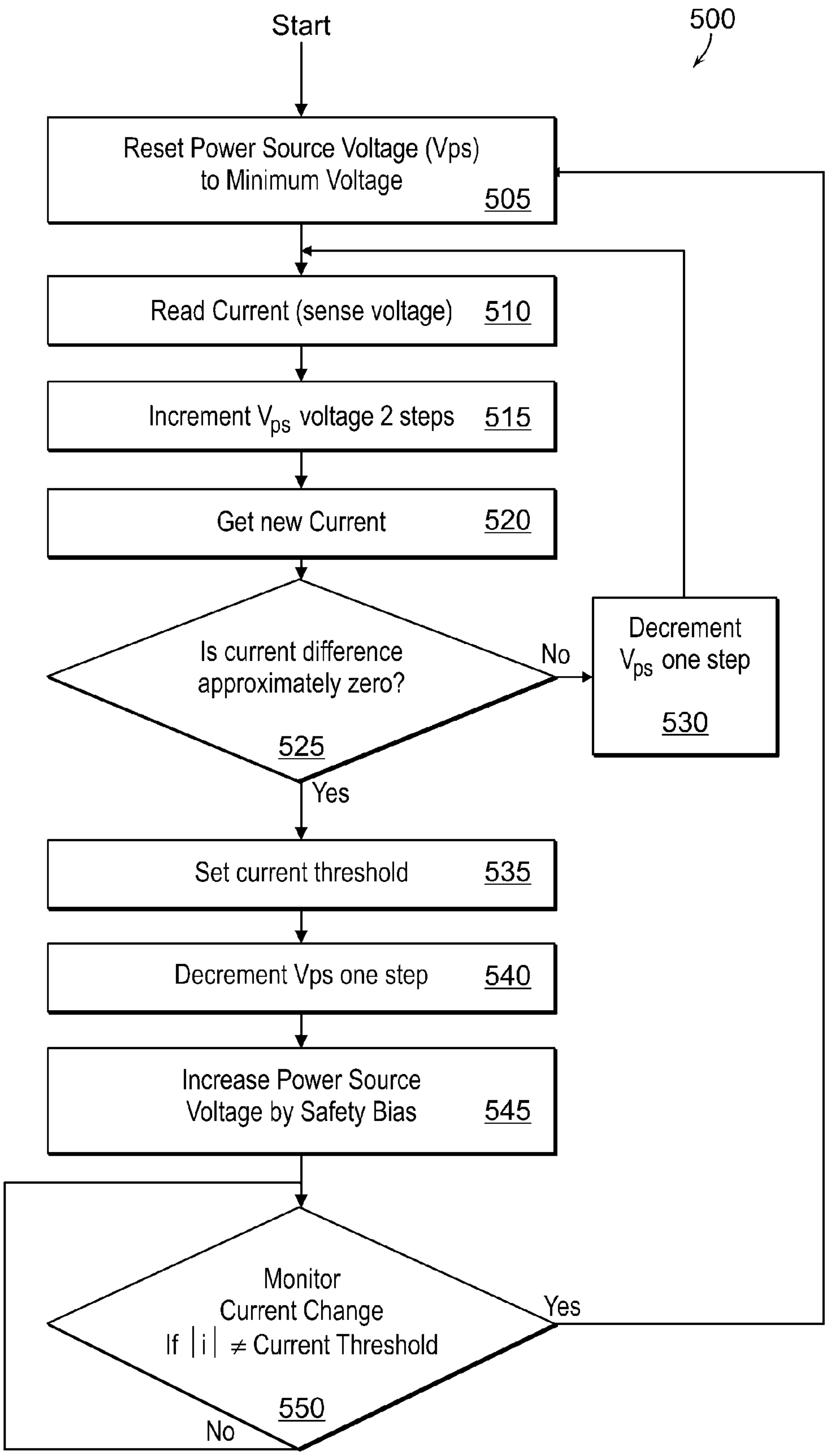
FIG. 4B is a flow diagram illustrating a method for regulating voltage in a remote device where a current threshold for the remote device is determined.

FIG. 4B shows another example of a flow diagram or algorithm 500 for the aforementioned system 200 (FIG. 2), where the current threshold is determined by identifying the constant current region. First, the power source 210 (FIG. 2) is set to a minimum voltage (Step 505). Next, the controller 230 (FIG. 2) measures the current at the location of the power source 210 (Step 510). The controller 230 increments the power source 210 voltage by two steps (Step 515). A new current is measured based on the two step increase in the power source 210 voltage (Step 520). If the difference between the new current measurement and the measured current before the two step increase is not substantially equal to zero (Step 525), the controller 230 recognizes that the current is still climbing in the undesired linear region of the remote device 220 (FIG. 2) and the controller 230 decreases the power source 210 voltage by one step (Step 530). From this new voltage, which is a single step voltage increase from the power source voltage before the two step increase, the controller 230 repeats the current difference measurement for a two step voltage increase (Step 510) until the current is no longer climbing in the linear region. If the controller 230 determines the current difference is substantially equal to zero, then the remote device 220 is operating in the constant current region and the controller 230 sets the current threshold (Step 535). The controller 230 decreases the power source 210 voltage by one step (Step 540). In some embodiments, the controller 230 can optionally increase the power source 210 voltage by a safety bias to ensure the remote device 220 is operating within the optimal operating region and not just on the edge of the constant current region. The system 200 (FIG. 2) continuously monitors the current (Step 550) with a change in current prompting a new convergence cycle (Step 505).

The following is one example of the system 200 (FIG. 2) using the algorithm 500 as described with reference to the preceding figures for remotely powered backlighting for LED signs having a current-voltage characteristic shown in Graph 1 (FIG. 3) and is not intended to be a preferred embodiment. Assume the power source 210 (FIG. 2) has a minimum voltage set to six volts ($V_{PS}$=6.00V) (Step 505). Next, the controller 230 (FIG. 2) measures the current at the location of the power source 210 and according to Graph 2 (FIG. 3), the measured current is 1.5 A (Step 510), which means that the remote device's voltage is approximately four volts ($V_{LED}$=4.00V). The controller 230 increments the power source 210 voltage by two steps (Step 515).

Assuming a step of 2.00V, the power source 210 voltage is increased from 6.00V to 10.00V. A new current is measured based on the power source 210 voltage increase to 10.00V, the new current being approximately 2.00 A (Step 520). Since the difference between the new current measurement and the measured current before the two step increase is 0.50 A (Step 525) the controller 230 recognizes that the current is still climbing in the undesired linear region of the LED sign and the controller 230 decreases the power source 210 voltage by one step from 10.00V to 8.00V (Step 530).

According to Graph 2 (FIG. 3), the algorithm will continue looping through Step 510, Step 515, Step 520, and Step 530 until the voltage at Step 510 has been increased to or above 17.00V ($V_{PS}$=17.00) because 17.00V is the beginning of the constant current region, entering the optimal operating region. Continuing with the above example of algorithm 500 from a starting voltage of 17.00V, the controller 230 measures the current, the current being 4.50 A (Step 510). The controller 230 increments the power source 210 voltage by two steps (Step 515) increasing from 17.00V to 21.00V. A new current is measured based on the power source 210 voltage increase to 21.00V, the new current being 4.50 A. Since the difference between the new current measurement and the measured current before the two step increase is zero, the controller 230 determines the LED sign is operating within the constant current region and the controller 230 sets the current threshold (Step 535). The controller 230 decreases the power source 210 voltage by one step from 21.00V to 19.00V (Step 540). Optionally, the controller 230 then increases the power source 210 voltage by a safety bias to ensure the device is operating within the optimal operating region. Assuming a safety bias of 1.00V, the power source voltage is increased from 19.00V to 20.00V. The system 200 continuously monitors the current (Step 460) with a change in current prompting a new convergence cycle (Step 410).

The system 200 provides distinct economical advantages to distribute power from a remote or central location over wire pairs to devices that require low DC or AC voltages that must be regulated within a remote device dependant compliant range of operation. This is in contrast to installing a separate power supply at each device location.

One distinct economical advantage occurs for a device localized power supply scheme which requires a high voltage AC main outlet for each device location. The aforementioned system allows for a centralized approach that reduces the high voltage AC main hookup and the corresponding installation costs to a single outlet for the device. Further, most jurisdictions are governed by electrical codes which require a licensed professional to install the AC outlet, however in most instances for low voltage wiring a licensed professional is not required thereby reducing installation costs.

Another distinct economical advantage occurs when attempting to centralize power without the ability to compensate. Centralizing power without the ability to compensate demands that the wire gauge used is sufficiently sized to reduce the effect of its losses for a given wire pair. The cost of the wire increases with the increase in thickness of the wire gauge. The aforementioned system allows for the use of thinner wire gauge, since wire losses can be automatically compensated by voltage adjustment of the sourcing supply thereby reducing overall costs.

Another distinct economical advantage occurs because the aforementioned system allows for remote adjustment of the power being coupled to the remote device, eliminating the need for manual compensation. Manual compensation requires greater installer knowledge of the complex interaction of wire length, wire gauge, voltage drop and load current, as well parametric accuracy of these corresponding components. Manual adjustments are static and can not respond to dynamic load change or future renovations that could endanger device operation. The ability to provide remote or centralizing sourcing of power confers numerous advantages as, but not limited to, those shown above.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing regulated voltage for at least one device remote from a power source, comprising:

monitoring a current response of the remote device in close proximity to the power source; and adjusting a voltage of the power source in steps until the current response reaches a current level that corresponds to a desired operating voltage of the remote device, wherein the remote device exhibits a non-linear or piecewise linear current voltage characteristic and the desired operating voltage of the remote device is determined by monitoring the current response until the step in the voltage results in a current response substantially equal to a current response of a previous voltage step.

2. The method of claim 1, wherein determining the desired operating voltage of the remote device includes adding a bias to the voltage step that results in a current response substantially equal to the current response of the previous voltage step.

3. The method of claim 1, wherein the current voltage relationship of the remote device is processed at the power source to guide the voltage at the remote device to converge into the proper operating voltage.

4. The method of claim 1, wherein the voltage is DC or AC.

5. The method of claim 1, wherein the steps or discreet or continuous.

6. A method for providing regulated voltage for at least one device remote from a power source, comprising:

monitoring a current response of the remote device in close proximity to the power source; and adjusting a voltage of the power source in steps until the current response reaches a current level that corresponds to a desired operating voltage of the remote device, wherein the remote device exhibits a non-linear or piecewise linear current voltage characteristic and the desired operating voltage of the remote device is determined by monitoring the current response for a specific current response due to a specific voltage step.

7. The method of claim 6, wherein the current voltage relationship of the remote device is processed at the power source to guide the voltage at the remote device to converge into the proper operating voltage.

8. The method of claim 6, wherein the voltage is DC or AC.

9. A method for providing regulated voltage for at least one device remote from a power source, comprising:

monitoring a current response of the remote device in close proximity to the power source; and adjusting a voltage of the power source until the current response reaches a current level that corresponds to a desired operating voltage of the remote device, wherein the remote device exhibits a non-linear or piecewise linear current voltage characteristic and the desired operating voltage of the remote device is determined by monitoring the current response for a specific current response due to a specified sequence of voltage steps.

10. The method of claim 9, wherein the current voltage relationship of the remote device is processed at the power source to guide the voltage at the remote device to converge into the proper operating voltage.

11. A method for providing regulated voltage for at least one device remote from a power source, comprising:

monitoring a current response of the remote device in close proximity to the power source; and adjusting a voltage of the power source until the current response reaches a current level that corresponds to a desired operating voltage of the remote device, wherein the remote device exhibits a non-linear or piecewise linear current voltage characteristic and the voltage is adjusted to a level that compensates for the voltage drop in a paired wire pair due to at least one of device current draw, wire gauge, and wire length.

12. The method of claim 11, wherein the current voltage relationship of the remote device is processed at the power source to guide the voltage at the remote device to converge into the proper operating voltage.

13. A system for providing regulated voltage for at least one device remote from a power source, comprising:

a power source couple to a remote device through a wire pair for supplying voltage to the remote device; and a controller for monitoring a current response of the remote device in close proximity to the power source and adjusting the voltage of the power source until a current response reaches a current level that corresponds to a desired operating voltage of the remote device, wherein the remote device exhibits a non-linear or piecewise linear current-voltage characteristic and the supply voltage is automatically adjusted to a level that compensates for a voltage drop in the wire pair due to at least to device current draw, wire gauge, and wire length.

14. The system of claim 13, wherein the controller monitors the current response over the wire pair.

15. The system of claim 13, wherein the voltage is DC or AC.

16. The system of claim 13, wherein the power source and controller are integrated into a single device or comprise separate units.

17. The system of claim 13, wherein the controller has a sensor to monitor the current response.

18. A system for providing regulated voltage for at least one device remote from a power source, comprising:

a power source couple to a remote device through a wire pair for supplying voltage to the remote device; and a controller for monitoring a current response of the remote device in close proximity to the power source and adjusting the voltage of the power source until a current response reaches a current level that corresponds to a desired operating voltage of the remote device, wherein the remote device exhibits a non-linear or piecewise linear current-voltage characteristic and the current voltage relationship of the remote device is processed at the power source to guide the voltage at the remote device to converge into the desired operating voltage.

19. The system of claim 18, wherein the power source and controller are integrated into a single device or comprise separate units.

20. The system of claim 18, wherein the controller has a sensor to monitor the current response.

21. The system of claim 18, wherein the controller monitors the current response over the wire pair.

* * * * *